US 9,128,688 B2

United States Patent
Liu

(10) Patent No.: US 9,128,688 B2
(45) Date of Patent: Sep. 8, 2015

(54) METHOD, APPARATUS AND SYSTEM FOR DEVICE MANAGEMENT

(75) Inventor: Chuanxiu Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 277 days.

(21) Appl. No.: 13/812,577

(22) PCT Filed: May 9, 2011

(86) PCT No.: PCT/CN2011/073842
§ 371 (c)(1),
(2), (4) Date: Jan. 28, 2013

(87) PCT Pub. No.: WO2012/016463
PCT Pub. Date: Feb. 9, 2012

(65) Prior Publication Data
US 2013/0124899 A1    May 16, 2013

(30) Foreign Application Priority Data

Aug. 2, 2010  (CN) .......................... 2010 1 0248581

(51) Int. Cl.
*G06F 1/26*       (2006.01)
*G06F 1/32*       (2006.01)
(Continued)

(52) U.S. Cl.
CPC ............... *G06F 1/26* (2013.01); *G06F 1/3203* (2013.01); *G06F 1/3287* (2013.01); *H04L 41/0833* (2013.01); *H04L 41/0893* (2013.01); *H04L 43/0817* (2013.01); *Y02B 60/1282* (2013.01)

(58) Field of Classification Search
CPC ........ G06F 1/26; G06F 1/3203; G06F 1/3287
USPC .......................................... 713/324, 300, 320
See application file for complete search history.

(56) References Cited

U.S. PATENT DOCUMENTS 6,023,148 A     2/2000  Pignolet
6,687,837 B1 *  2/2004  Beck ............................. 713/300
2004/0249534 A1 * 12/2004 Yamada et al. .................. 701/36
(Continued)

FOREIGN PATENT DOCUMENTS

CN      1125366 A      6/1996
CN    101119548 A      2/2008
(Continued)

OTHER PUBLICATIONS

International Search Report for PCT/CN2011/073842 dated Aug. 5, 2011.

*Primary Examiner* — Thomas Lee
*Assistant Examiner* — Volvick Derose
(74) *Attorney, Agent, or Firm* — Ling Wu; Stephen Yang; Ling & Yang Intellectual Property

(57) ABSTRACT

A method, apparatus and system for managing a device are provided by the present invention, which relate to the field of communication. The method includes: according to a preset power management rule, determining a power supply policy of each single board in the current device (302); and according to the power supply policy, performing power management on each single board (303). The technical scheme provided by the present invention is applied to the power management of a device with multiple single boards, and the problem of serious energy consumption in redundancy backup is solved.

11 Claims, 4 Drawing Sheets

(51) Int. Cl.
*H04L 12/24* (2006.01)
*H04L 12/26* (2006.01)

(56) References Cited

U.S. PATENT DOCUMENTS

2006/0053324 A1     3/2006   Giat et al.
2006/0161794 A1*    7/2006   Chiasson et al. ............. 713/300
2006/0259797 A1*   11/2006   Fung ............................. 713/300
2008/0114997 A1     5/2008   Chin
2009/0089782 A1*    4/2009   Johnson et al. ............... 718/100
2009/0183014 A1*    7/2009   Chen et al. .................... 713/300
2010/0171602 A1     7/2010   Kabbara et al.
2011/0113263 A1*    5/2011   Bi et al. ........................ 713/300

FOREIGN PATENT DOCUMENTS

CN     101902362 A    12/2010
GB        2404054 A     1/2005

* cited by examiner

METHOD, APPARATUS AND SYSTEM FOR DEVICE MANAGEMENT

TECHNICAL FIELD

The present invention relates to the field of communication, and particularly, to a method, apparatus and system for managing a device.

BACKGROUND OF THE RELATED ART

With the rapid development of the Internet, network-based applications increase gradually, which raises higher requirements on the reliability of networks. A Virtual Router Redundancy Protocol (VRRP) can meet the reliability requirements of network devices well, in the protocol, redundancy backup is performed on a Default Gateway of a terminal IP device on a shared multi-access medium (such as the Ethernet), thus, when one router or switching equipment therein is down, a backup router or a backup switching equipment can take over a forwarding work in time and provide transparent switching for users, which improves the network service quality.

When a product of Ethernet switch is in a VRRP redundancy backup mode, a standby device needs to keep in a running status for a long time, which inevitably leads to serious energy consumption and inefficiency.

SUMMARY OF THE INVENTION

The present invention provides a method, apparatus and system for device management, which solves the problem of serious energy consumption in redundancy backup.

A method for managing a device comprises:

determining a power supply policy of each single board in a current device according to a preset power management rule;

performing power management on each single board according to the power supply policy.

Preferably, the single board comprises a line card and a standby master control board, and the step of determining a power supply policy of each single board in the current device according to a preset power management rule comprises:

a master control board monitoring a current operating state of the device, and according to the preset power management rule, determining the power supply policy of each single board in the device;

the step of performing power management on each single board according to the power supply policy comprises:

the master control board distributing the power supply policy of each single board to a corresponding single board respectively;

each single board executing a corresponding operation according to the power supply policy.

Preferably, the step of determining a power supply policy of each single board in the current device according to a preset power management rule comprises:

the step of performing power management on each single board according to the power supply policy comprises:

the master control board monitoring and informing each single board in the device of the current operating state of the device;

each single board determining the power supply policy of a current single board according to the preset power management rule and the current operating state of the device;

the single board executing a corresponding operation according to the power supply policy of the current single board.

Preferably, the power management rule is specifically turning on or turning off a service power supply or a corresponding chip power supply on the single board according to a received upper layer command; or turning on the service power supply or the corresponding chip power supply on the single board when a switching signal is detected; or setting an ON time, during which the service power supply or the corresponding chip power supply on the single board is kept turned on, and beyond which the service power supply or the corresponding chip power supply on the single board is kept turned off; or setting an ON threshold and an OFF threshold, when data traffic processed by the device reaches the ON threshold, turning on the service power supply or the corresponding chip power supply on the single board, and when the data traffic processed by the device reaches the OFF threshold, turning off the service power supply or the corresponding chip power supply on the single board.

Preferably, before the step of determining a power supply policy of each single board in the current device according to a preset power management rule, the method further comprises:

setting the power management rule.

The present invention further provides an apparatus for managing a device, which comprises:

a management control module, configured to determine a power supply policy of each single board in the current device according to a preset power management rule;

a power management module, configured to perform power management on each single board according to the power supply policy.

Preferably, the management control module is further configured to set the power management rule.

The present invention further provides a system for managing a device, which comprises: a master control board and a single board; wherein, the master control board is configured to: according to a preset power management rule, determine a power supply policy of each single board in the current device, and according to the power supply policy, perform power management on each single board.

The present invention further provides a system for managing a device, which comprises a single board;

the single board is configured to: according to a preset power management rule, determine a power supply policy of a current line card, and according to the power supply policy, perform power management on a current single board.

Preferably, the above system for managing the device further comprises a master control board;

the master control board is configured to: monitor and inform the single board of a current operating state.

The present invention provides a method, apparatus and system for managing a device, according to a preset power management rule, a power supply policy of each single board in the current device is determined, and according to the power supply policy, power management is performed on the single board, which implements a control on power supply of the single board according to system requirements, and solves the problem of serious energy consumption in redundancy backup.

PREFERRED EMBODIMENTS OF THE PRESENT INVENTION

The redundancy backup will increase greatly the average power consumption of network system while enhancing the reliability of network system, since a standby device needs to keep in a ruuning state for a long time when a product of Ethernet switch is in a VRRP redundancy backup mode, this inevitably leads to serious energy consumption and inefficiency. Against the background of the increasingly grave global warming, promotion of energy conservation and emission reduction, and emphasis on low carbon emission nowadays, a solution to the problem that the device of Ethernet switch has serious energy consumption and poor efficiency in the VRRP redundancy backup mode is of great importance.

Figure 1:
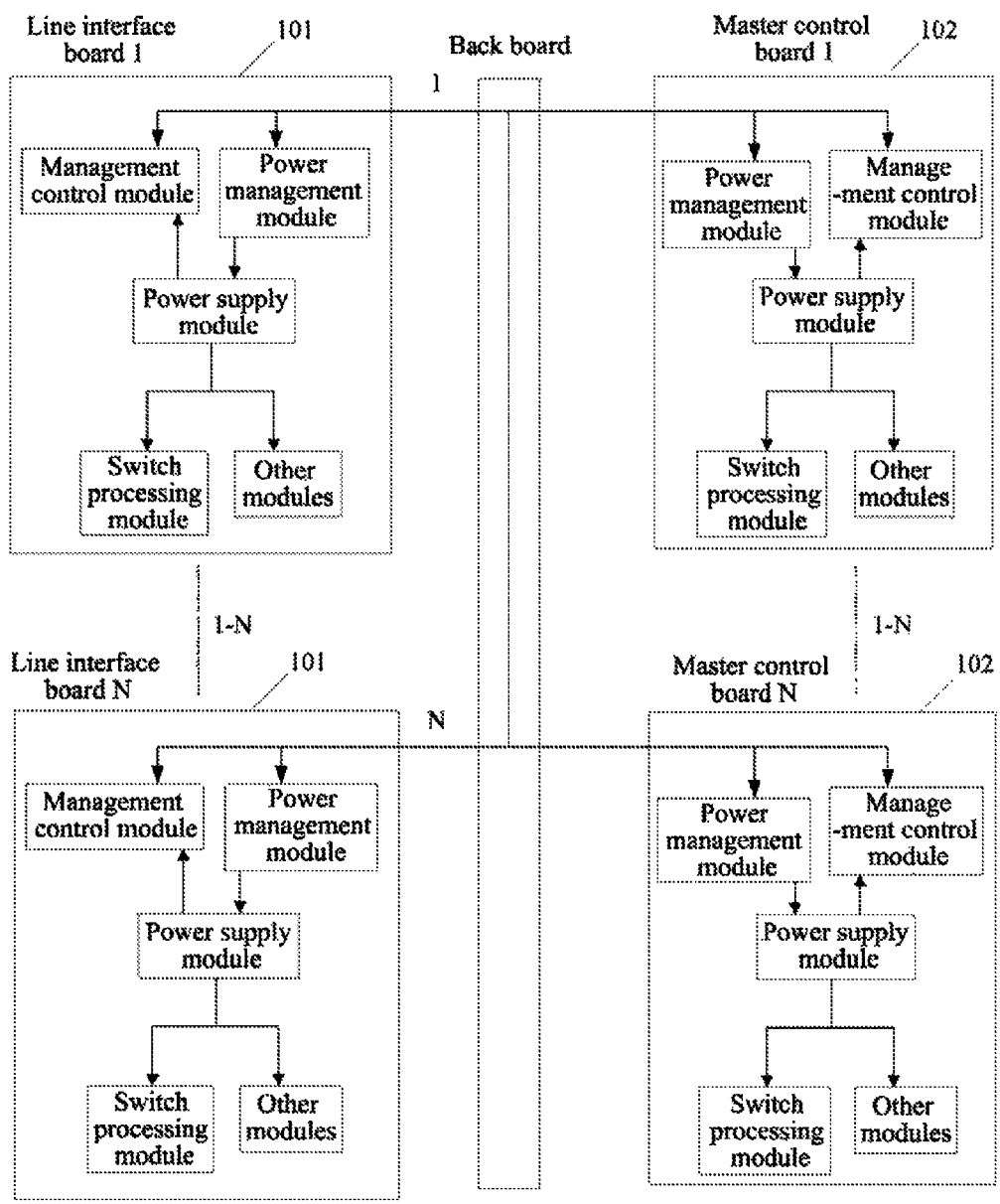
FIG. 1 is a schematic diagram of an application environment according to the embodiment of the present invention.

In order to solve the above problem, an application environment of the embodiment of the present invention is as shown in FIG. 1, which consists of a line interface board (a line card, for short) 101 and a master control board 102, the line card is responsible for accessing an access layer device or a core layer device, the master control board is responsible for a maintenance management and a forwarding work between line cards. Both the master control board and the line card provided by the embodiment of the present invention are required to use a modular design, and include a power management module, a management control module, a power supply module, a switch processing module and other modules. Power supply for the power management module and management control module is required to be separate from service power supply on the board, and the power management module controls the power supply module, which turns on and turns off the service power supply on the current line card or on the current master control board. Preferably, on-off control can be provided for power supply of each chip respectively in the power management module.

The management control module of the master control board is connected with each line card, management control modules and the power management module of other master control boards, wherein the power management module is responsible for performing control on the power supply module of a single board, the power management module can arbitrarily turn off or turn on a service power supply of a single board in which the power management module is located or a power supply of a certain chip on the single board, wherein the power management module and management control module use an independent power supply which is completely separated from other service power supplies on the single board. The management control module of the master control board is responsible for determining a power management policy of the device (when there are multiple master control boards, a management control module of an active master control board is responsible for the determination), the master control board can control the power supply on the board by the management control module and power management module of each single board controlling the power supply module, and can turn off or turn on the power supply of the single board or the power supply of each module or chip on the single board, the power supply of the master control board or active master control board itself can not be turned off, and the management control module and power management module on each line card can not be turned off either.

Figure 2:
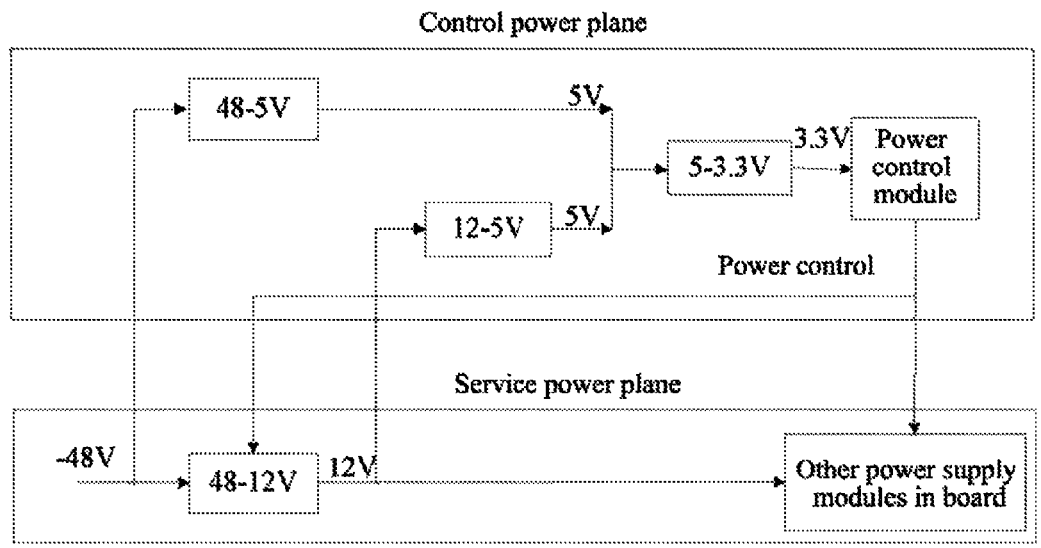
FIG. 2 is a principle block diagram of power control of a single board provided by the embodiment of the present invention.

FIG. 2 illustrates a principle block diagram of power control of a single board provided by the embodiment of the present invention, the power supply used by the single board includes two parts: a control power plane and a service power plane, the control power plane is responsible for supplying power to a power control module and a management control module of the single board, and the service power plane is responsible for supplying power to a power supply module. The power is supplied with 48V direct current, the control power plane is obtained through a 48V-5V and 5V to 3.3V power supply conversion module, the control power plane will never suffer an interruption of power supply, which guarantees the management and control functions for the single board; the service power plane obtains a common source with 48V-12V, then the power supply module in the single board converts the common source to a voltage required by each chip, and the power supply module is managed and controlled by a power management module. In order to guarantee the reliability of the power management module, the service power plane is also required to provide a standby 5V-power supply for the control power plane, and thus, once any of the control power plane and the service power plane is with no failure, a normal operation of the power management module and management control module can be guaranteed.

A method for managing a device provided by the embodiment of the present invention will be described in combination with the system for managing the device shown in FIG. 1 below.

Figure 3:
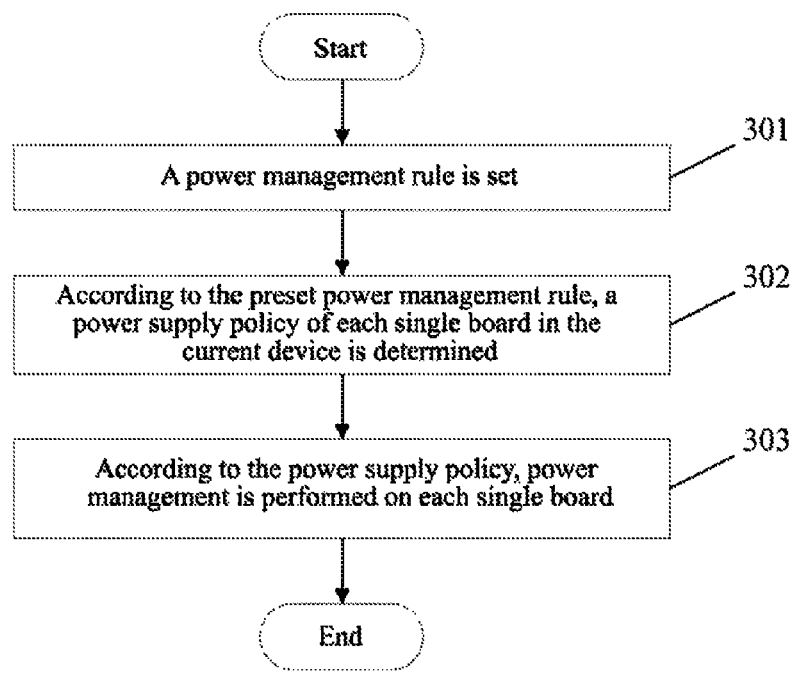
FIG. 3 is a flow diagram of a method for managing a device provided by the embodiment of the present invention.

The process of using the method for managing the device provided by the embodiment of the present invention to perform power management on the single board is as shown in FIG. 3, and the following steps are included.

In step 301, a power management rule is set.

In the embodiment of the present invention, it needs to decide whether it is required to turn on or turn off a certain single board or a chip on the single board according a certain rule, so as to implement the object of saving energy.

The single board in the embodiment of the present invention includes: a line card and a standby master control board. Since there may be multiple master control boards in the same system, during the normal operation, only one master control board is responsible for the managing and controlling the system, and other master control boards are precisely the standby master control boards. However, due to reasons such as breakdown or alternation, it is required to enable the standby master control board, and the standby master control board continues to manage and control the system.

The power management rule is specifically: turning on or turning off corresponding single boards or chips on the boards according to the received upper layer command, for example, a user instructs to turn off a certain single board or the chips on the certain single board.

The power management rule also can be: turning on the corresponding single boards or the chips on the boards when a switching signal is detected, when a master/standby switching occurs, if the current device serves as a standby device after the switching completes, it can turn off part of the single boards or chips so as to reduce energy consumption; and if the current device serves as a master device after the switching completes, it needs to turn on the turned-off single boards or chips so as to adapt to service requirements.

The power management rule also can be: setting an ON time, during which the corresponding single boards or the chips on the boards are kept turned on, and beyond which the corresponding single boards or the chips on the boards are kept turned off. In consideration of that operating pressures of the device at different time intervals are different, a comparatively busy time can be set as the ON time, and in a comparatively idle time, part of the single boards or the chips on the boards can be turned off.

The power management rule also can be: setting an ON threshold and an OFF threshold, when data traffic processed by the device reaches the ON threshold, turning on the corresponding single boards or the chips on the boards, and when the data traffic processed by the device reaches the OFF threshold, turning off the corresponding single boards or the chips on the boards. Similarly, with respect to the conditions of different operating pressures, the current service demands also can be judged according to the data traffic so as to implement a real-time adjustment, and in the condition of guaranteeing quality of service, energy is saved as much as possible. Alternatively, multilevel thresholds also can be set, every level of threshold corresponds to a certain number of single boards and chips, after the data traffic reaches a certain threshold, single boards and chips corresponding to the threshold are turned on, and after the data traffic drops to the threshold, the single boards and chips corresponding to the threshold are turned off.

Figure 4:
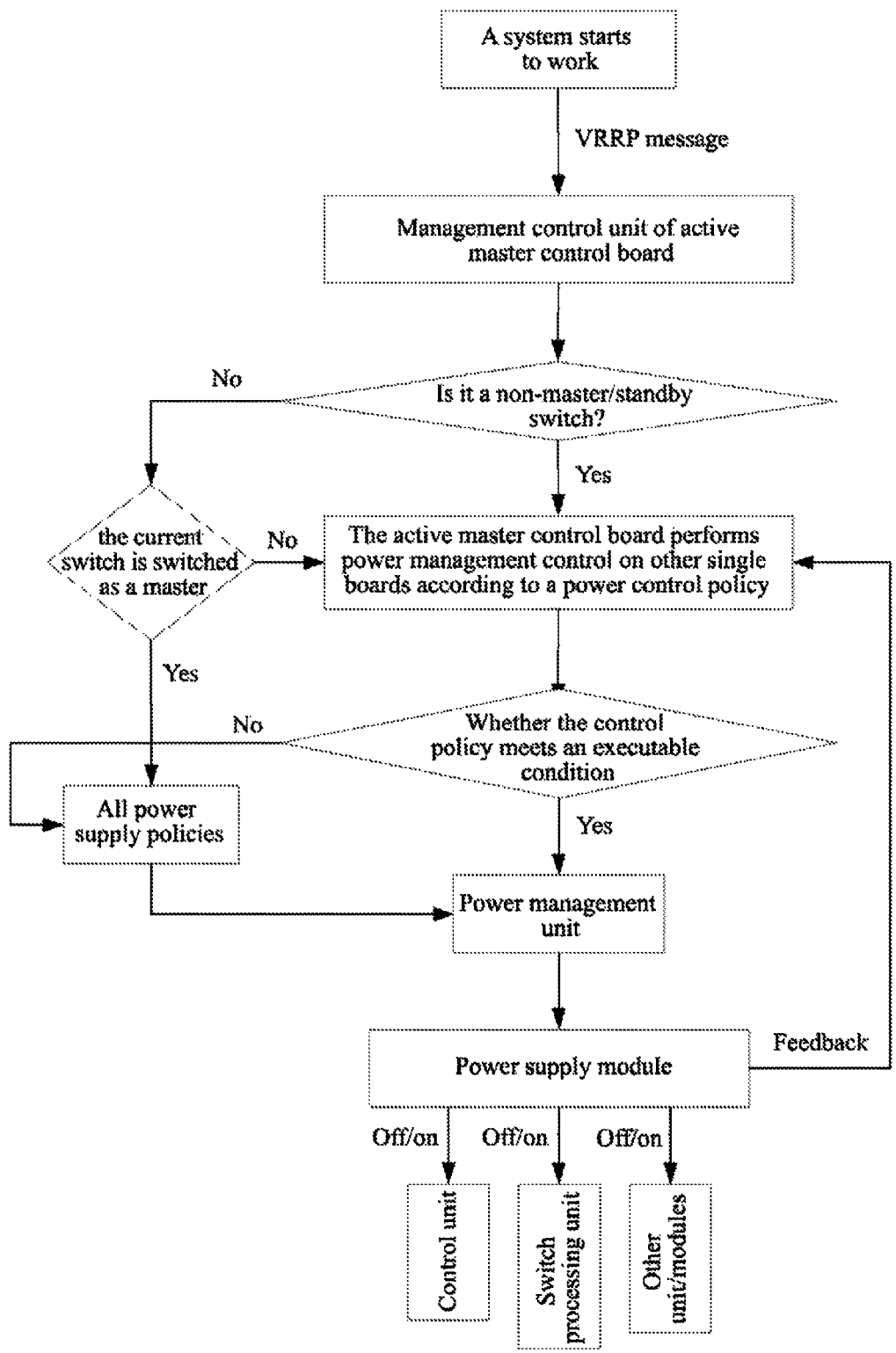
FIG. 4 is a diagram of energy-saving operating mode of an Ethernet switch in a VRRP networking application mode provided by the embodiment of the present invention.

The power management rule can be executed by the master control board, and also can be executed by the single board. Specifically, the single board can be set into three operating modes:
  1. full function mode;
  2. Power saving mode;
  3. Off mode Wherein, all the chips on the single board are turned on in the full function mode, part of the chips (i.e. the specified chips) on the single board are turned on in the power saving mode, and the whole single board is turned off in the off mode, that is, as an example, it is to take the device as an Ethernet switch to illustrate, as shown in FIG. 4, it is a block diagram of energy-saving operating mode of the Ethernet switch in a VRRP networking application mode provided by the embodiment of the present invention, the switch is in a VRRP master/standby redundancy mode, i.e. a low carbon and energy-saving operating mode, wherein, a master device is a SwitchA and a standby device is a SwitchB. A default gateway from AL1 to ALN is set as the SwitchA, the SwitchA becomes a master switch and takes charges of data forwarding; once the SwitchA fails, the SwitchB starts the switching promptly and becomes the master control. The SwitchB serves as the standby device, in the low carbon and energy-saving mode, the active master control of the SwitchB performs power management on the controlled other master control boards or single boards according to a certain policy, for example, power supplies of part or all of the chips of each single board are turned off to reduce power consumption in a time period in the morning with comparatively low requirements on communication reliability, a large amount of electrical energy is saved, if the master device is in abnormal during this time period, the power supplies turned off in the standby device are turned on promptly, and the master device is switched. Compared with VRRP master/standby hot backup, switch products also can switch the master device and the standby device at any time in the energy-saving mode, but the switching time will also be prolonged to some extent, with regard to the art field or time period with comparatively low requirements on communication reliability, if a switch with the energy-saving operating mode is used and an energy saving policy is adopted in pertinence, in a premise that main reliability requirements of the system are not influenced, the average working power consumption will be reduced greatly, which increases characteristics of energy conservation and environment protection, and also reduces use-costs of the switch products.

The switch works in a VRRP master/standby mutual redundancy backup mode, i.e a low carbon and energy-saving operating mode, wherein, the SwitchA and SwitchB belong to two VRRP groups which backup each other simultaneously, the SwitchA is an owner of IP address in group 1, and the SwitchB is an owner of IP address in group 2. A default gateway from AL1 to AL(N/2−1) is set as the SwitchA, and default gateway from AL (N/2+1) to ALN is set as the SwitchB. Since the master switch and the standby switch backup each other in redundancy, a policy of performing energy saving and consumption reducing according to service traffic of the switch can be adopted. If the bandwidth of service traffic is 50% lower than the total bandwidth of the switch, a certain policy can be used to turn off the power supplies of chips on part or all of the single boards of a certain switch, and if the application field also has time-sensitive reliability requirements, time information also can be integrated in the policy so as to guarantee the maximum reliability of the system, which can make a balance between system reliability and system efficiency conveniently to obtain an optimum operating mode.

In step 302, according to the preset power management rule, a power supply policy of each single board in the current device is determined.

In the step, a master control board control module monitors an operating state of the device in real time, according to the power management rule set in step 301, determines the power supply policy of each single board in the current device, and informs control modules of all the single boards.

Alternatively, each single board also can complete the determination of power supply policy of the current single board independently. Specifically, it is completed by a control module of each single board.

In step 303, according to the power supply policy, power management is performed on each single board.

In the step, according to the power supply policy determined by step 303, the control module of each single board controls a power management module to turn on or turn off a service power supply.

The embodiment of the present invention provides a method for managing a device, according to a preset power management rule, a power supply policy of each single board in the current device is determined, and according to the power supply policy, management is performed on each single board, which controls the power supply of the single board according to system requirements, and solves the problem of serious energy consumption in redundancy backup. Compared with common devices of Ethernet switch, in a VRRP mode, the Ethernet switch operating in a low carbon energy-saving mode, due to its highly free energy-saving policy and modular power management design, can make a balance between system reliability and system efficiency conveniently to reach an optimum operating mode, which reduces the average working power consumption of the system greatly to attain the target of low carbon and energy saving.

Figure 5:
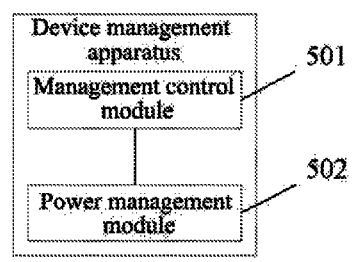
FIG. 5 is a schematic diagram of structure of an apparatus for managing a device provided by the embodiment of the present invention.

The embodiment of the present invention also provides an apparatus for managing a device, a structure of the apparatus is as shown in FIG. 5, which comprises:

a management control module 501, configured to determine a power supply policy of each single board in the current device according to a preset power management rule;

a power management module 502, configured to perform power management on each single board according to the power supply policy.

Preferably, the management control module 501 is further configured to set the power management rule.

The embodiment of the present invention also provides a system for managing a device, which comprises a master control board and a single board, and the apparatus for managing the device as shown in FIG. 5 is integrated into the master control board;

the master control board is configured to: according to a preset power management rule, determine a power supply policy of each single board in the current device, and according to the power supply policy, perform power management on each single board.

The embodiment of the present invention also provides a system for managing a device, which comprises a single board, and the apparatus for managing the device as shown in FIG. 5 is integrated into the single board;

the single board is configured to: according to a preset power management rule, determine a power supply policy of a current line card, and according to the power supply policy, perform power management on the current single board.

Preferably, the above system for managing the device also includes a master control board;

the master control board is configured to monitor and inform the single board of the current operating state.

The above apparatus and system for managing the device can be combined with a method for managing the device provided by the embodiment of the present invention, according to the preset power management rule, the power supply policy of each single board in the current device is determined, and according to the power supply policy, power management is performed on the single board, which controls the power supply of the single board according to system requirements, and solves the problem of serious energy consumption in redundancy backup.

The ordinary person skilled in the art can understand that all or part of the steps in the above method can be implemented by using a flow of computer program, the computer program can be stored in a computer readable memory medium, the computer program is executed on a corresponding hardware platform (such as a system, a device, an apparatus and an component, etc.), and during the execution, one of the steps or a combination thereof in the embodiments of the method is included.

Alternatively, all or part of the steps of the above embodiments also can be implemented by using integrated circuits, these steps can be made into many integrated circuit modules respectively, or multiple modules or steps therein are made into a single integrated circuit module to be implemented. Therefore, the present invention is not limited to any combination of hardware and software in a specific form.

Each apparatus/function module/function unit in the above embodiments can be implemented by using universal calculating devices, they can be put together on a single calculating device, and also can be distributed in a network composed of multiple calculating devices.

When implemented in a form of software function module and sold or used as an independent item, each apparatus/function module/function unit in the above embodiments can be stored in a computer readable memory medium. The computer readable memory medium mentioned above can be a read-only memory, magnetic disk or optical disk and so on.

Industrial Applicability

The present invention provides a method, apparatus and system for managing a device, according to a preset power management rule, a power supply policy of each single board in the current device is determined, and according to the power supply policy, power management is performed on each single board, which controls the power supply of the single board according to system requirements, solves the problem that, when a product of Ethernet switch is in a VRRP redundancy backup mode, a standby device needing to keep in a running status for a long time inevitably leads to serious energy consumption and inefficiency, and has a great importance against the background of the increasingly grave global warming, promotion of energy conservation and emission reduction, and emphasis on low carbon emission nowadays. Part of the present invention or the whole present invention can be implemented in a form of software or hardware or a combination thereof

What is claimed is:

1. A method for managing a device comprising: determining a power supply policy of each single board in the device according to a preset power management rule;
   performing power management on each single board according to the power supply policy;
   wherein the device is one of a first device and a second device working in a Virtual Router Redundancy Protocol (VRRP) redundancy backup mode;
   the power supply policy comprises:
   when the first device is a master device and the second device is a standby device, power supplies of part or all of chips of each single board of the standby device are turned off to reduce power consumption in a time period; when the master device is in abnormal during this time period, the power supplies turned off in the standby device are turned on, and the master device and the standby device are switched;
   when the first device and the second device belong to two VRRP groups which backup each other, and when a bandwidth of service traffic of the device is lower than a threshold, turning off power supplies of chips on part or all of single boards of the device.

2. The method for managing the device according to claim 1, wherein, the single board comprises a line interface board and a standby master control board, and the step of determining a power supply policy of each single board in the device according to a preset power management rule comprises:
   a master control board monitoring a current operating state of the device, and determining the power supply policy of each single board in the device according to the preset power management rule;
   the step of performing power management on each single board according to the power supply policy comprises:
   the master control board distributing the power supply policy of each single board to a corresponding single board respectively;
   each single board executing a corresponding operation according to the power supply policy.

3. The method for managing the device according to claim 1, wherein, the step of determining a power supply policy of each single board in the device according to a preset power management rule comprises:
   the master control board monitoring and informing each single board in the device of the current operating state of the device;
   each single board determining the power supply policy of a current single board according to the preset power management rule and the current operating state of the device;
   the step of performing power management on each single board according to the power supply policy comprises:
   the single board executing a corresponding operation according to the power supply policy of the current single board.

4. The method for managing the device according to claim 1, before the step of determining a power supply policy of each single board in the current device according to a preset power management rule, further comprising:
   setting the power management rule.

5. The method for managing the device according to claim 1, wherein, the power management rule is:
   turning on or turning off a service power supply or a corresponding chip power supply on the single board according to a received upper layer command; or
   turning on the service power supply or the corresponding chip power supply on the single board when a switching signal is detected; or
   setting an ON time, during which the service power supply or the corresponding chip power supply on the single board is kept turned on, and beyond which the service power supply or the corresponding chip power supply on the single board is kept turned off; or
   setting an ON threshold and an OFF threshold, when data traffic processed by the device reaches the ON threshold, turning on the service power supply or the corresponding chip power supply on the single board, and when the data traffic processed by the device reaches the OFF threshold, turning off the service power supply or the corresponding chip power supply on the single board.

6. A device, comprising multiple single boards, the single boards comprises a line interface board and a master control board;
   wherein both the master control board and the line interface board card comprise a power management module, a management control module, and a power supply module;
   the management control module of the master control board is configured to determine a power supply policy of each single board in the device according to a preset power management rule;
   the power management module is configured to perform power management on each single board according to the power supply policy;
   wherein the device is one of a first device and a second device working in a Virtual Router Redundancy Protocol (VRRP) redundancy backup mode;
   the power supply policy comprises
   when the first device is a master device, and the second device is a standby device, power supplies of part or all of chips of each single board of the standby device are turned off to reduce power consumption in a time period, when the master device is in abnormal during this time period, the power supplies turned off in the standby device are turned on, and the master device and the standby device are switched;
   when the first device and the second device belong to two VRRP groups which backup each other, and when a bandwidth of service traffic of the device is lower than a threshold, turning off power supplies of chips on part or all of single boards of the switch.

7. The device according to claim 6, wherein,
   the management control module is further configured to set the power management rule.

8. The method for managing the device according to claim 2, wherein, the power management rule is:
   turning on or turning off a service power supply or a corresponding chip power supply on the single board according to a received upper layer command; or
   turning on the service power supply or the corresponding chip power supply on the single board when a switching signal is detected; or
   setting an ON time, during which the service power supply or the corresponding chip power supply on the single board is kept turned on, and beyond which the service power supply or the corresponding chip power supply on the single board is kept turned off; or
   setting an ON threshold and an OFF threshold, when data traffic processed by the device reaches the ON threshold, turning on the service power supply or the corresponding chip power supply on the single board, and when the data traffic processed by the device reaches the OFF threshold, turning off the service power supply or the corresponding chip power supply on the single board.

9. The method for managing the device according to claim 3, wherein, the power management rule is:
   turning on or turning off a service power supply or a corresponding chip power supply on the single board according to a received upper layer command; or
   turning on the service power supply or the corresponding chip power supply on the single board when a switching signal is detected; or
   setting an ON time, during which the service power supply or the corresponding chip power supply on the single board is kept turned on, and beyond which the service power supply or the corresponding chip power supply on the single board is kept turned off; or
   setting an ON threshold and an OFF threshold, when data traffic processed by the device reaches the ON threshold, turning on the service power supply or the corresponding chip power supply on the single board, and when the data traffic processed by the device reaches the OFF threshold, turning off the service power supply or the corresponding chip power supply on the single board.

10. The method for managing the device according to claim 4, wherein, the power management rule is:
   turning on or turning off a service power supply or a corresponding chip power supply on the single board according to a received upper layer command; or
   turning on the service power supply or the corresponding chip power supply on the single board when a switching signal is detected; or
   setting an ON time, during which the service power supply or the corresponding chip power supply on the single board is kept turned on, and beyond which the service power supply or the corresponding chip power supply on the single board is kept turned off; or
   setting an ON threshold and an OFF threshold, when data traffic processed by the device reaches the ON threshold, turning on the service power supply or the corresponding chip power supply on the single board, and when the data traffic processed by the device reaches the OFF threshold, turning off the service power supply or the corresponding chip power supply on the single board.

11. The device according to claim 6, wherein, power supply for the power management module and management control module is separate from service power supply on the board, the management control module of the master control board is connected with the management control module and the power management module of each line interface board card;

the power management module and management control module use an independent power supply which is completely separated from other service power supplies on the single board;

the power supply of the master control board, and the management control module and power management module on each line interface board can not be turned off.

* * * * *